United States Patent [19]

Hansen

[11] Patent Number: 5,615,366
[45] Date of Patent: Mar. 25, 1997

[54] SYSTEM AND METHODS FOR IMPROVED SORTING

[75] Inventor: Kurt Hansen, Santa Cruz, Calif.

[73] Assignee: Borland International, Inc., Scotts Valley, Calif.

[21] Appl. No.: 664,270

[22] Filed: Jun. 11, 1996

Related U.S. Application Data

[63] Continuation of Ser. No. 12,703, Feb. 2, 1993, Pat. No. 5,551,018.

[51] Int. Cl.$^6$ .................................................. G06F 17/30
[52] U.S. Cl. ................................ 395/607; 364/DIG. 1; 364/222.9; 395/758
[58] Field of Search ........................ 395/600; 364/419.08

[56] References Cited

U.S. PATENT DOCUMENTS

| | | | |
|---|---|---|---|
| 3,611,316 | 10/1971 | Woodrum | 395/800 |
| 4,575,798 | 3/1986 | Lindstrom et al. | 395/600 |
| 4,809,158 | 2/1989 | McCauley | 395/600 |
| 5,072,386 | 12/1991 | Garneau et al. | 364/419.08 |
| 5,148,541 | 9/1992 | Lee et al. | 395/600 |
| 5,175,803 | 12/1992 | Yeh | 395/100 |
| 5,274,805 | 12/1993 | Ferguson et al. | 395/600 |
| 5,307,265 | 4/1994 | Winans | 364/419.19 |
| 5,426,779 | 6/1995 | Chambers, IV | 395/600 |
| 5,487,164 | 1/1996 | Kirchhofer et al. | 395/600 |
| 5,551,018 | 8/1996 | Hansen | 395/600 |

OTHER PUBLICATIONS

Sedgewick, *Algorithms in C*, Addison–Wesley, 1990.

*Primary Examiner*—Wayne Amsbury
*Attorney, Agent, or Firm*—John A. Smart

[57] ABSTRACT

System and methods are described for sorting information records in a fast and efficient manner. The present invention is particularly useful in environments where resources, such as available memory storage, are limited. A preferred method of the present invention includes scanning the field of records to be sorted (e.g., from left to right), whereby the system recursively divides the records into smaller groups, as determined by the values at a current position (i.e., the location currently under examination). As the members of a group drop below a predetermined threshold value, traditional improved sorting techniques (e.g., quicksort or insertsort) may be applied to the group to complete the sort.

22 Claims, 8 Drawing Sheets

SYSTEM AND METHODS FOR IMPROVED SORTING

This is a Continuation Patent Application of Ser. No. 08/012,703, filed Feb. 2, 1993, now U.S. Pat. No. 5,551,018.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

Perhaps one of the most fundamental tasks to the operation of computers is sorting—the process of arranging a set of similar information into a desired order. While employed in virtually all database programs, sorting routines are also extensively used in many other areas. Common examples include compilers, interpreters, and operating system software. And in many instances, the quality and performance of such software is judged by the efficiency of its sorting techniques. Since sorting methodology plays such an important role in the operation of computers and other data processing systems, there has been much interest in seeking ways to improve existing systems and methods.

Historically, techniques for sorting information are divided into three general methods: exchange, selection, and insertion. Each will now be reviewed in turn.

To sort by exchange, a system swaps or "exchanges" out-of-order information until all data members are ordered. Perhaps the best-known example of exchange sorting is the infamous "bubble sort." The general methodology behind the bubble sort is that of repeated comparisons and attendant exchanges of adjacent members. In this manner, the method is analogous to bubbles in water, where each bubble percolates to its proper level.

As shown by the following C language example, a bubble sort method keeps passing through a set of members, exchanging adjacent elements as needed.

```
bubble(int a[ ], int N)
    {
        int i, j, t;
        for (i = N; i >= 1; i—)
            for (j = 2; j <= i; j++)
                if (a[j-1] > a[j])
                    { t = a[j-1]; a[j-1] = a[j]; a[j] = t; }
    }
```

When no more exchanges are required, the set is sorted. Observe that the number of comparisons for a bubble sort is always the same; particularly, the two "for" loops will repeat a specified number of times, regardless of when the list is ordered. This observation may be generalized as follows: the bubble sort will always perform $\frac{1}{2}(n^2-n)$ comparisons, for "n" number of elements to be sorted. In other words, the outer loop executes n−1 times, while the inner loop executes n/2 times.

Having considered the number of possible comparisons, next one should consider the possible number of exchanges required by the bubble sort. For an already sorted list (best case), no exchanges are required (i.e., the number of exchanges equals zero). As a list becomes less ordered, however, the number of elements that are out of order approaches the number of comparisons. The end result is that the execution time approaches a multiple of the square of the number of elements, making the bubble sort unusable for large sorts.

A selection sort, perhaps one of the simplest sorting algorithms, proceeds as follows. A system continually chooses or "selects" a data member from one extreme of possible values, such as the lowest-value member, until all members have been selected. Because the system always selects the lowest-value member from those remaining, the set will be ordered from lowest to highest-value member when the process is completed. The sort may be implemented by the following C code:

```
selection(int a[ ], int N)
    {
        int i, j, min, t;
        for (i = 1; i < N; i++)
            {
                min = i;
                for (j = i+1; j <= N; j++)
                    if (a[j] < a[min]) min = j;
                t = a[min]; a[min] = a[i]; a[i] = t;
            }
    }
```

As shown by this code snippet, the method first finds the lowest-value element in an array and exchanges it with the element in the first position. Next, the second smallest element is located and exchanged with the element in the second position. The process continues in this way until the entire array is sorted.

Like the bubble sort, the outer loop above executes n−1 times, while the inner loop executes ½(n) times. Thus, the technique requires roughly $n^2$ comparisons, making it also too slow for processing a large number of items.

In a sort by insertion, the system examines a data member and places or inserts that member into a new set of members, always inserting each member in its correct position. The sort is completed when the last member has been inserted. This sort technique may be implemented as follows:

```
insertion(int a[ ], int N)
    {
        int i, j, v;
        for (i = 2; i <= N; i++)
            {
                v = a[i]; j = i;
                while (a[j-1] > v)
                    { a[j] = a[j-1]; j—; }
                a[j] = v;
            }
    }
```

Unlike the previous two sorting techniques, however, the number of comparisons that occur with this technique depends on the initial order of the list. More particularly, the technique possesses "natural" behavior; that is, it works the least when the list is already sorted and vice versa, thus making it useful for lists which are almost in order. Also, the technique does not disturb the order of equal keys. If a list is sorted using two keys, the list will remain sorted for both keys after an insertion sort.

A particular concern for any sort method is its speed, that is, how fast a particular sort completes its task. The speed with which an array of data members can be sorted is directly related to the number of comparisons and the number of exchanges which must be made. Related to the characteristic of speed is the notion of "best case" and "worst case" scenarios. For instance, a sort may have good speed given an average set of data, yet unacceptable speed given highly disordered data.

One technique for reducing the penalty incurred by exchanging full records is to employ a method which operates indirectly on a file, typically using an array of indices, with rearrangement done afterwards. In this manner any of the above sorting methods may be adapted so that only n "exchanges" of full records are performed. One particular approach is to manipulate an index to the records, accessing the original array only for comparisons. In other words, it is more efficient to sort an index to the records than incurring the cost of moving large records around excessively.

Since all of the simple sorting techniques above execute in $n^2$ time, their usefulness for sorting files with a large number of records is limited. In other words, as the amount of data to be sorted increases, the execution speed of the technique becomes exponentially slower, at some point, too slow to use. Thus, there has been great interest in developing improved techniques for sorting information.

Perhaps the best-known improved sorting technique is quicksort, invented in 1960. Quicksort's popularity is due in large part to its ease of implementation and general applicability to a variety of situations. Based on the notion of exchange sorting, it adds the additional feature of "partitions", which will now be reviewed.

With quicksort, a value or "comparand" is selected for partitioning the array into two parts. Those elements having a value greater than or equal to the partition value are stored on one side, and those having a value less than the partition value are stored on the other side. The process is repeated for each remaining part until the array is sorted; as such, the process is essentially recursive. The quicksort "divide-and-conquer" method of sorting may be implemented by the following recursive function:

```
quicksort(int a[ ], int 1, int r)
  {
    int i;
    if (r > 1)
      {
        i = partition(1, r);
        quicksort(a, 1, i–1);
        quicksort(a, i+1, r);
      }
  }
```

Quicksort is not without its disadvantages, however. Being recursive in nature, the technique usually requires that a significant amount of stack-based memory be reserved. Moreover, the technique, which is particularly sensitive to long common substrings, exhibits nonlinear behavior. This nonlinearity may be summarized as follows: $c_1*n*\log 2(n)$. The constant $c_1$ is approximately proportional to the average compare length, that is, the average point where two records differ. In the case of many common substrings in the data, or just many duplicates, the average compare length is fairly large, thus affecting the total sort time accordingly. In particular, every character in every record in the first "average compare length number of" characters is used an average of $\log 2(n)$ times.

The basic theory and operation of these and other sorting and search techniques are well documented in the technical and trade literature. A general introduction to the topic may be found in Sedgewick, R., *Algorithms in C*, Addison-Wesley, 1990. A more detailed analysis of the topic may be found in Knuth, D., *Sorting and Searching*, The Art of Computer Programming: Vol. 3, Addison-Wesley, 1973.

More advanced techniques are described in the patent literature. For instance, Sorting Method and Apparatus, U.S. Pat. No. 4,809,158, describes a method for sorting records where the records are placed in various bins depending on the character on which the record is presently being sorted. The bins, in turn, are linked together. The records from a first bin are then sorted again on the next letter of the record, and so on until the records are fully ordered and placed in a "Done" area. Next, records from the second bin are put into final order and placed into the "Done" area, being appended to the already sorted records from the first bin. The process continues taking records from successive bins, ordering the subgroup, and appending it to the "Done" group, until the entire collection is sorted. Despite advantages over quicksort technique, the described method has a pronounced limitation. In particular, the linking together of records incurs a substantial cost in terms of memory requirements. For instance, sorting one million records would require an extra four megabytes of memory, if linked.

The disclosure of each of the foregoing references is hereby incorporated by reference.

SUMMARY OF THE INVENTION

The present invention recognizes a need for providing methods which afford efficient and rapid sorting and which may be implemented in a variety of systems, including those with limited resources. Thus, according to the present invention, methods are described whereby any character (or other system-comparable unit) within a record is accessed at most twice, and the existence of common substrings is turned into an advantage. A system of the present invention sorts information records by recursively dividing the records into small subgroups based on a value at the current position under examination. As the subgroups drop below a selected threshold, such as about 100, the method may revert to traditional improved sorting techniques (e.g., quicksort or insertsort).

A particular feature of the present invention is the ability to detect a situation where all records in a current group have a common part (i.e., a common substring) from the current position which is being examined. When such a situation is detected, the system simply skips to the end of the common substring (by incrementing the value of the current position with the length of the common part), thereby avoiding unnecessary sorting.

Also described is an improved method of the present invention for sorting international data, that is, information having National Language Support (such as a character set accommodating a particular country, national language, local convention, culture, or the like). Such information may include characters which require special processing for proper sorting. For instance, diphthong characters must be "expanded" into separate characters (e.g., expanding "æ" into "a" and "e") in order to be properly sorted.

The present invention recognizes that in the case of international data the statistical occurrence of data members requiring special treatment is relatively small (e.g., on the order of 10% or less); this aspect may be exploited to greatly enhance the performance of international sorting. A preferred method for sorting international data includes sorting a set of records first using the above-described sorting method (where the records are recursively subdivided according to byte values at successive positions). This generates a set of records which are nearly sorted. Next, the nearly sorted set is sorted using insertion sort technique (or other technique suited for nearly ordered data). At this step, any special processing required by the international data (e.g., expanding characters) is performed. Optionally, one may test the data beforehand to determine whether the information approaches a worse case (e.g., numerous multinational characters); if such an instance is detected, the method may revert to traditional international sorting technique.

The present invention minimizes or eliminates many of the well known disadvantages attendant to systems employing the quicksort algorithm, including excessive memory stack requirements, sensitivity to long common substrings, and non-linearity. Moreover, by fitting more records in memory, the present invention is particularly advantageous for sorting a large number of records (when compared, for example, to linking bins of records).

DETAILED DESCRIPTION OF A PREFERRED EMBODIMENT

For clarity, the following description will focus on an embodiment of the present invention in a database environment. Specifically, since most readers will have at least some exposure to database systems, it is helpful to describe the present invention as implemented in such systems. The present invention is, however, not limited to any particular exemplary embodiment. Instead, the teachings of the present invention may be advantageously applied to a variety of applications, operating on a variety of architectures. Application of the principles of the present invention is particularly advantageous in those systems where a rapid, yet efficient mechanism for sorting information is desired. Therefore, the following preferred embodiment and certain alternatives are offered for purposes of illustration and not limitation.

General Architecture

Figure 1A:
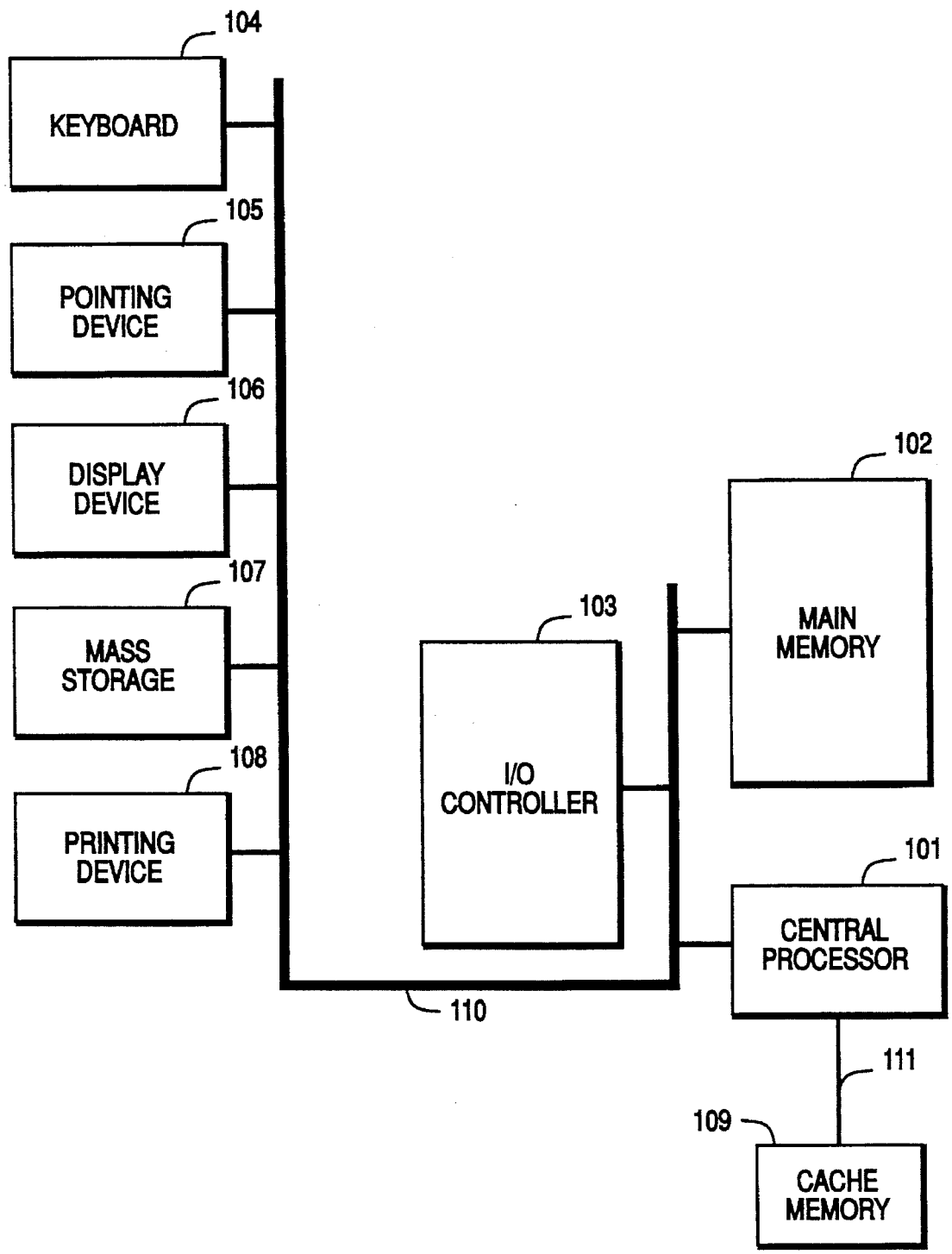
FIG. 1A is a block diagram of a computer system in which the present invention is operative.

The present invention may be embodied on a computer system such as the system 100 of FIG. 1, which includes a central processor 101, a main memory 102 (e.g., random-access memory or RAM), an input/output controller 103, a keyboard 104, a pointing device 105 (e.g., mouse, track ball, pen device, or the like), a display device 106, and a non-volatile or mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). System 100 may also be provided with additional input/output devices, such as a printing device 108, as desired. The various components of the system 100 communicate through a system bus 110 or similar architecture, as shown.

Figure 1B:
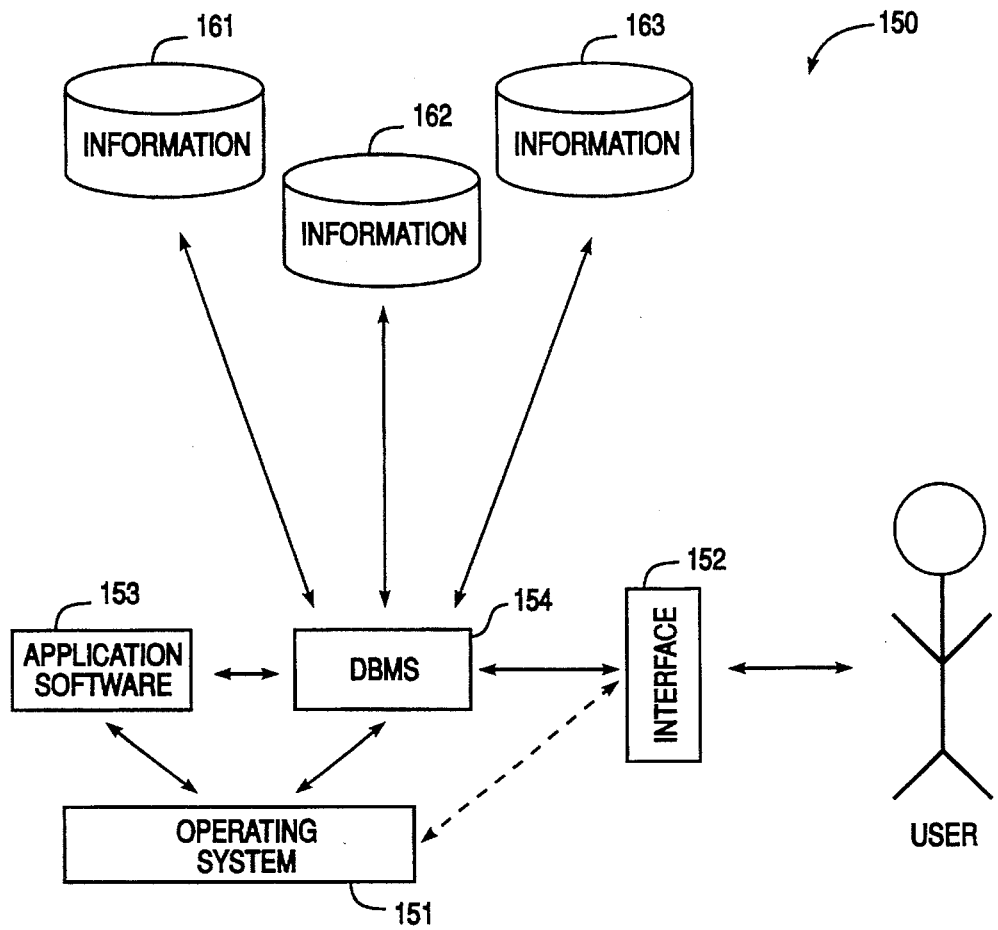
FIG. 1B is a block diagram of a database management system (DBMS) which is operative in the system of FIG. 1A.
Figure 1C:
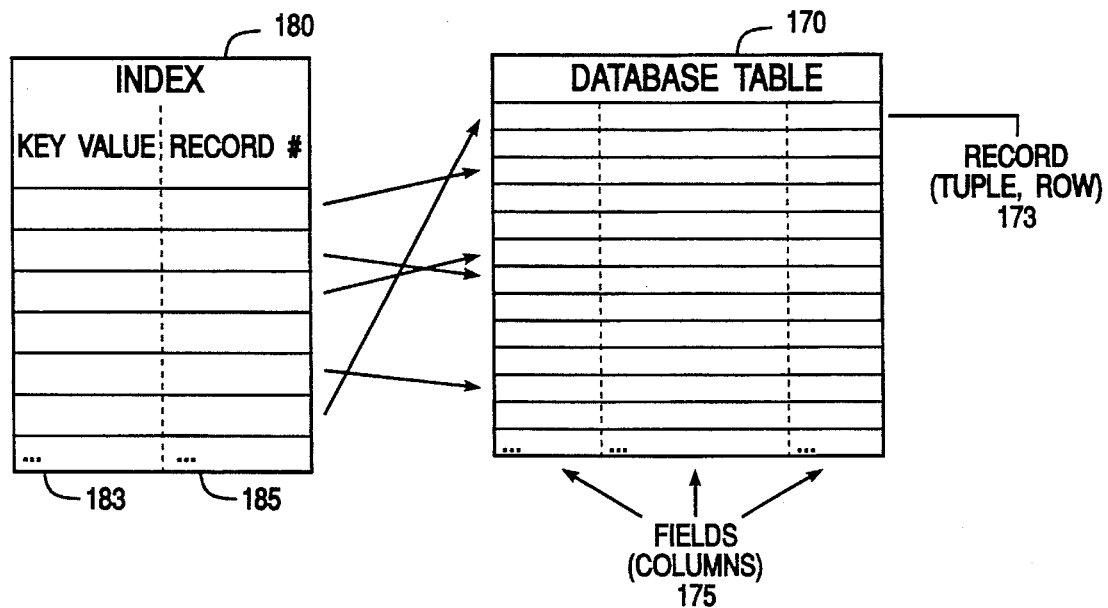
FIG. 1C is a diagram illustrating the storage and management of information in the DBMS of FIG. 1B.

Illustrated in FIG. 1B, a computer software system 150 is provided for programming the operation of the computer system 100. Software system 150, which is stored in system memory 102 and on disk memory 107, includes a kernel or operating system 151 and a DBMS 154. OS 151 is the executive or supervisor for the system 100, directing both task management and data management.

DBMS 154, on the other hand, is a software subsystem for storing, retrieving, and manipulating information in database tables (e.g., tables 161, 162, 163). Under the command of DBMS 154, the system 100 receives user commands and data through user interface 152. Interface 152 includes a built-in query surface or editor for accessing and processing database information. Additional application programs, such as DBMS application software 153, may be "loaded" (i.e., transferred from storage 107 into memory 102) for execution by the system 100, particularly for further controlling the operation of DBMS 154.

In a preferred embodiment, the system 100 is an IBM-compatible personal computer system, available from a variety of vendors (including IBM of Armonk, N.Y.), and operating system 151 is MS-DOS operating system software, available from Microsoft of Redmond, Wash. DBMS 154 is preferably a relational database management system (RDBMS). More preferably, DBMS 154 includes Paradox® for Windows Database Management System (available from Borland International of Scotts Valley, Calif.). As interface 152, Paradox provides a worksurface or "canvas" and a command menu; a QBE query worksurface is also provided. Application software 153, in turn, include database command-language applications (e.g., PAL™ scripts), which may be executed or otherwise acted upon by the DBMS 154.

At the outset, it is helpful to understand general techniques for storing information in DBMS 154. In a relational database management system, information is organized into tables, such as table 170 of FIG. 1C. As conceptually shown, table 170 typically includes horizontal rows or records (tuples) 173 and vertical columns or fields 175. A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

By employing one or more database indexes, the records of a table can be organized in many different ways, depending on a particular user's needs. As shown by index 180 of FIG. 1C, for example, an index may be constructed as a single disk file which is referred to internally by the system for locating and displaying records in a database file (e.g., table 170). Index 180 stores two types of information: index key values 183 and unique record numbers 185. An index key is a data quantity composed of one or more fields from a record; keys are used to arrange (logically) the database file records by some desired order (index expression). Record numbers, on the other hand, are unique pointers to the actual storage location of each record in the database file. In this manner, an index for a database file is similar to the index of a book, which lists subject keys and page numbers that point to where the actual information is located in the book. Specifically, an index organizes (logically not physically) the records in a database file according to the values in one or more fields of interest. As such, an index may greatly speed up searching (querying) for and sorting of information.

Creating and using an index has advantages over sorting (physically reordering a database file). For example, an index file takes up less disk space than a sorted database file, because an index file contains only the values of one or more fields of a database file rather than entire records. Since index files are typically smaller, a DBMS can use an index to organize a database faster than it can create a new, sorted file. Moreover, a number of indexes for organizing a database file may be created without storing a lot of redundant data. Finally, maintaining data in one indexed file rather than several sorted files promotes data integrity since there is only one version of the data.

Preferred Method for Sorting

A. Overview

According to the principles of the present invention, methods are provided for sorting of information, such as information records stored as a database table in system 100. In an exemplary method of the present invention, data records are sorted on selected fields (e.g., ascending, descending, or user-defined), where the fields to be sorted can be scanned from one direction to another, such as left to right or most significant byte to least significant byte (or other system-comparable form). Those skilled in the art will appreciate that most common data types may be readily converted into this form (if not already). To minimize memory requirements, the smallest unit of data for comparison should conveniently be accommodated by the given hardware. For memory systems accommodating bytes (8 bits) of information, for instance, the corresponding character data should preferably be no larger than 8 bits.

As another enhancement to performance, the sorting methods of the present invention will preferably be applied to an array of pointers to the records to be sorted (rather than the physical records themselves). Once the ordering has been established for the array, the records can easily be reordered physically as desired.

In accordance with the present invention, a set of data to be sorted is conveniently managed as information records as follows. A "group of records" represents records which are pointed to by a set of record pointers which may be stored in a pointer array, as identified by an index to the first pointer and a number for the number of records in the group. A "current group" is defined to be a set of records which is currently being sorted. "Current position" means the position (e.g., byte offset or position) in the record that is currently being evaluated.

For purposes of illustration, the sorting methods of the present invention are perhaps best described if one assumes there is only one field to sort on. In this manner, the reader may remain focused on the particular steps of the methods. Those skilled in the art, however, will readily appreciate that the system and methods of the present invention may be easily extended to sort any set of fields of records to be sorted. Therefore, the following is offered for purposes of illustration, not limitation.

In general operation, the system works by recursively dividing a "group of records" into smaller subgroups, determined by the values (e.g., byte values) at the "current position" of the represented group, as consecutive positions are scanned (e.g., moved from the most significant byte to the least significant byte). As the number of members remaining in a subgroup drops below a selected threshold value (e.g., 100), traditional improved sorting methodology, such as quicksort or insertsort, can optionally be applied on the subgroup to complete the sort (using the "current position" in the records as the starting point). By repeated testing, the system may detect a situation where all records in the "current group" have a common part (i.e., greater than one byte) starting at the "current position"; in this case, the "current position" is simply incremented with the length of the common part.

The sorting methods of the present invention eliminate or substantially reduce well known disadvantages of the quicksort algorithm, including stack requirements, sensitivity to long common substrings, and non-linearity ($c1*n* \log 2(n)$, where the constant c1 is approximately proportional to the average compare length, that is, the average point where two records differ). In the case of many common substrings present in the data, or just many duplicates, the average compare length will typically be large, thus affecting total sort time accordingly. Basically, every character in every record in the first "average comparelength number of" characters will be used an average of $\log 2(n)$ times.

According to the present invention, any character is accessed at most twice, and the existence of common substrings is turned into an advantage. The expected behavior is thus linear ($c1*n+c2*0(n)$), with the sorting time almost completely insensitive to the starting order of the records. Like quicksort, however, the technique is not a stable sort in the instance of duplicates.

The methods of the present invention are particularly advantageous when employed on a large number of records, as each recursion level requires some initialization that could become a dominant position as the number of records in the "current group" gets smaller. When a subgroup contains less than a selected threshold number of records, quicksort or other standard sorting technique may be applied. The threshold level is a constant whose actual value may be optimized to a particular embodiment of the present invention and a particular implementation of quicksort. When applying quicksort to a group, the starting position should preferably be the "current position", since all the records in the group have the same common part up until this position.

Internal operation

At the outset, it is helpful to study the inputs, output, and data structures employed within the system of the present invention. The following exemplary data members are provided as input to the method:

(1) char ** ppRecPtrs: array of pointers to records to be sorted.

(2) long iRecNum: number of record pointers in ppRecPtrs

Other useful attendant information may include a sort field specification describing number of sortfields, and their respective offsets, lengths and sortorder, such as ascending/descending order, or using a user-defined ordering (e.g., for international use). Also, in the case of user-supplied ordering (e.g., international characters), a simple mapping of the ordering of all the possible character values is needed. Country-specific sort orders are readily available (e.g., from ISO code page specifications).

The system of the present invention provides the following output:

ppRecPtrs: an array of pointers to be sorted according to a sort specification (e.g., ppRecPtrs[0] points to first record and so on.)

Internally, the system employs the following data structures and variables (simplified for purposes of discussion).

A. Globals members:
(1) int iCurPos:

The offset into the records of the byte that is currently being sorted (the 'current position').

(2) int iLastPos:

The offset into the records of the last byte to be sorted (in the current field)

B. Local members (dynamically allocated for each recursion level):

(1) long Counts[256]:

a COUNT array or array of 256 counters, each representing the number of occurrences of a given byte value.

(2) long Range[256]:

a RANGE array or array of 256 indexes into the PTRS array, each representing the starting range for a given byte value (meaning the first position in a range of pointers, where the records with this byte value at the "current position" will be placed). The length of the range is given by the corresponding entry in the COUNT array.

(3) int iGroups:

a Group count, the number of different occurrences of byte values for the "current group". This is also the number of ranges the "current group" will be divided into.

(4) int iGroupOffs:

an index into the record pointers array of the first record in the "current group".

(5) int iGroupRecs:

the number of records in the "current group".

Together, iGroupRecs and iGroupOffs define the "current group".

Referring now to FIGS. 2A–D, a preferred method 200 and submethods will be described. At steps 210, 220, initialization of the method is performed. Specifically, at step 210, the "current position" is set equal to the first byte in the first field; the initial "current group" contains all records. At step 220, the "count" and the "range" arrays are initialized, with attendant memory allocation performed as needed; the method typically operates most efficiently if allocation is done only once (or a minimum number of times). In a preferred embodiment, each array is initialized as an array of arrays, using a "worst case" estimate for the number of recursions needed (see step 300 below). At step 230, the number of records is tested against a threshold value. While the optimum "threshold" value depends on the actual implementation, a value of approximately 80 to 120, or more preferably about 100, has been empirically observed to be a good value for Intel 80×86 embodiments. With a less optimal quicksort, however, the number is likely to be lower (assuming an implementation employing the same exemplary methods described herein). If the number of records is less than this selected threshold (yes at step 230), then the method proceeds to step 235 of the submethod I, shown in FIG. 2C.

Figure 2A:
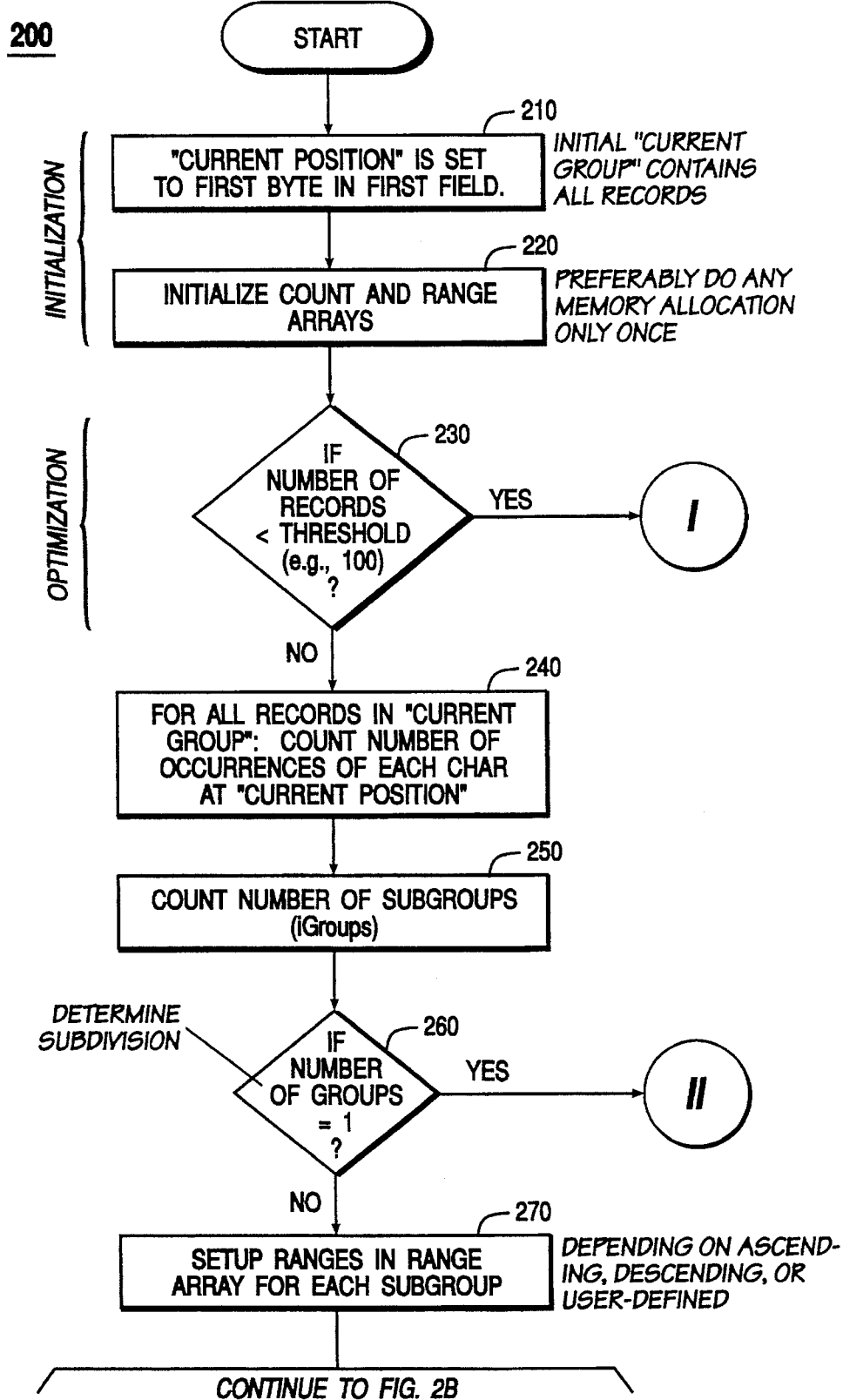
FIGS. 2A–E are flowcharts illustrating methods of the present invention for sorting information, such as data records.
Figure 2B:
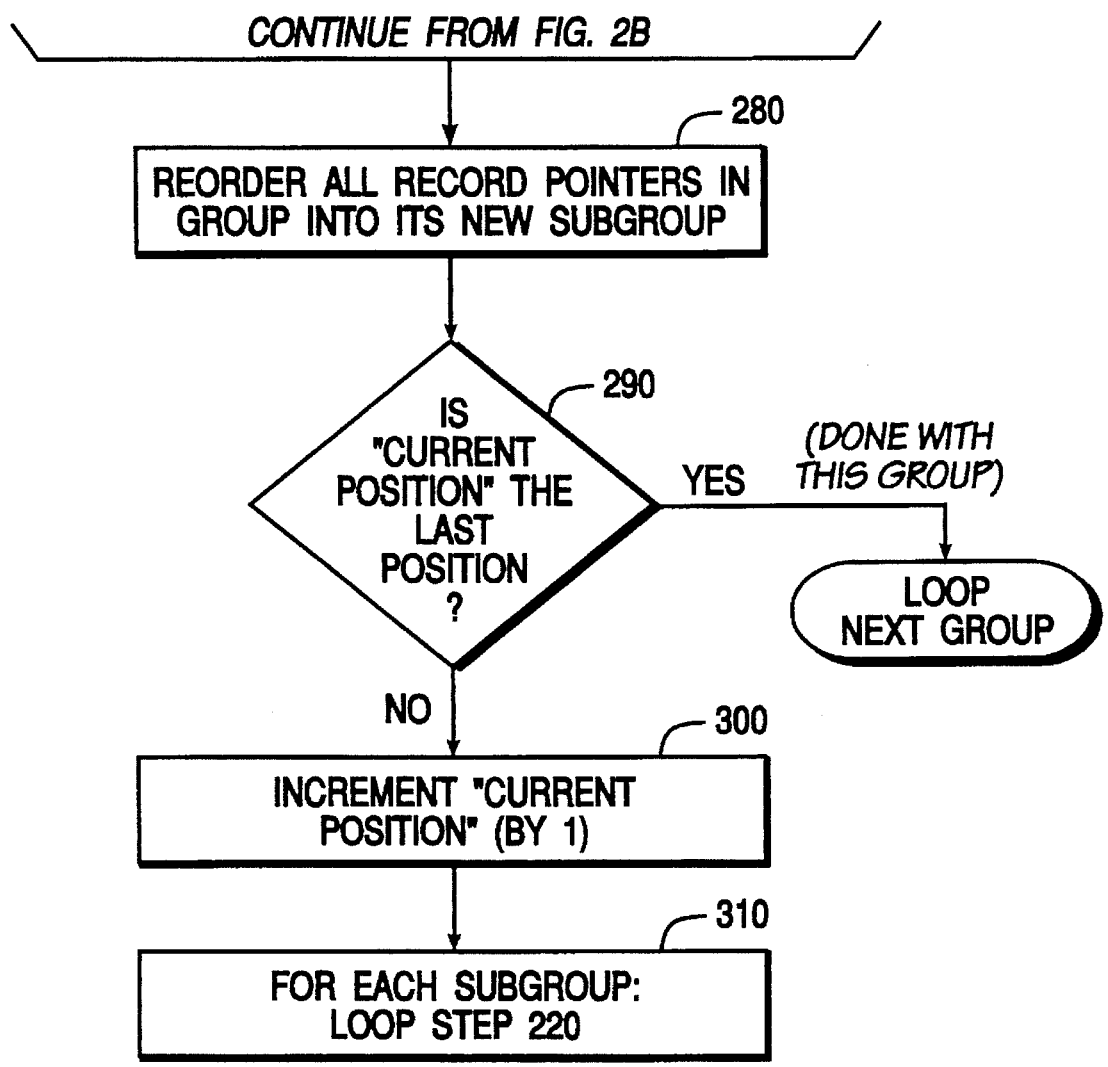
Figure 2C:
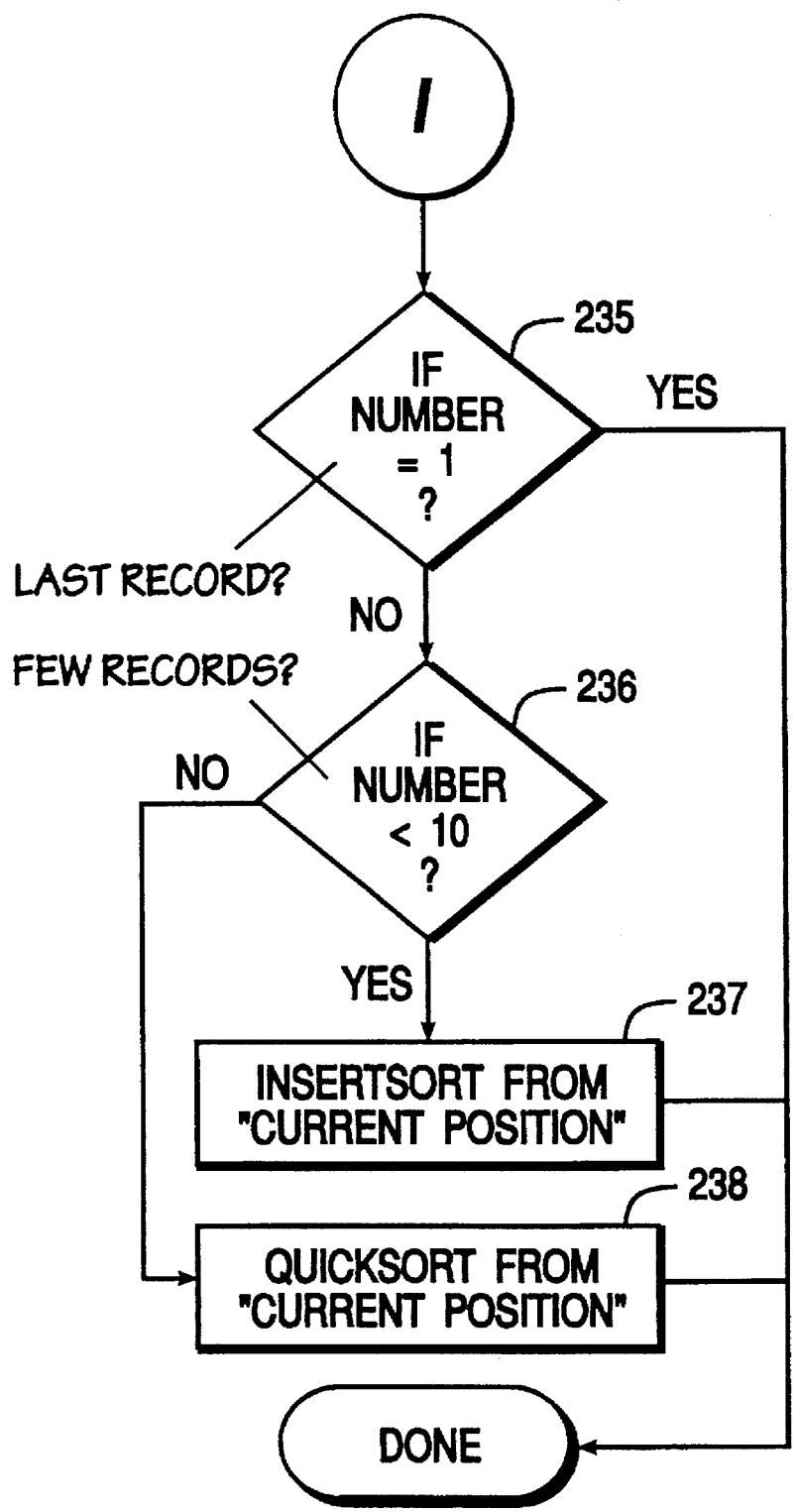

With particular reference to FIG. 2C, the submethod I will now be described. At step 235, a determination is made whether the method is at the last record (i.e., number of records equals one). If so (yes at step 235), then no more records remain to be sorted and the method is done. If more than one record remains (no at step 235), then the method proceeds to step 236 to test if only a few records remain (e.g., number less than 10). If few remain (yes at step 236), then the remaining records are sorted using insertion technique (insertsort from "current position") at step 237, after which the method has completed. Otherwise (no at step 236), the method proceeds to step 238 to sort the remaining records using quicksort technique (quicksort from "current position"), after which the method has completed.

Referring back to FIG. 2A, if the remaining records are not less than the selected threshold (no at step 230), the method proceeds to step 240. At step 240, a loop is established whereby for all records in "current group" the method counts the number of occurrences of each character at the "current position". In an exemplary embodiment, this may be constructed by the following C language "for" statement:

```
for (i = iGroupOffs; i < iGroupRecs; i++) {
    ch = ppRecPtrs[i] [iCurPos];    // get char
    Counts[ch]++;                    // inc count for char
}
```

As shown, for each record in the group, the method gets the character at the "current position" and increments the counter for that character (by one). Next, at step 250, the number of subgroups is counted. More particularly, the number of subgroups a given group can be divided into is equal to the number of "Counts" entries different from zero. In an exemplary embodiment, this step may be constructed by the following C language statements:

```
iGroups = 0; // init subgroup counter
for (i = 0; i < 256; i++)
    if (Counts[i]) iGroups ++;
// where Counts[ ] is an array of entries, each representing
// the number of occurrences of a given byte value
```

As shown, after the number of subgroups (iGroups) is initialized, a "for" statement is employed to loop through the various "Counts" entries; the occurrence of each non-zero entry causes iGroups (the subgroup counter) to be incremented accordingly.

For Intel 80×86 embodiments, one may "optionally" optimize the step as follows. Under protected mode of operation, one of the most computationally expensive operations is to change the contents of the segment registers ES or DS, which occurs every time a new record is accessed. Since each record is accessed twice on each iteration (steps 240 and 280), one may preallocate an array (at step 210) for storing the characters. If adequate memory resources are available, one may store the next character (if any) as well, without cost (i.e., without performance penalty). Moreover, in the instance where "iGroups" count equals 1, it is computationally very inexpensive to check if the next position will not cause any subdivision either (see step 267 below).

Continuing with the method, at step 260 the method determines whether the group was subdivided (i.e., whether the number of groups is equal to one). If no subdivision is found (yes at step 260), then the method proceeds to submethod II.

Figure 2D:
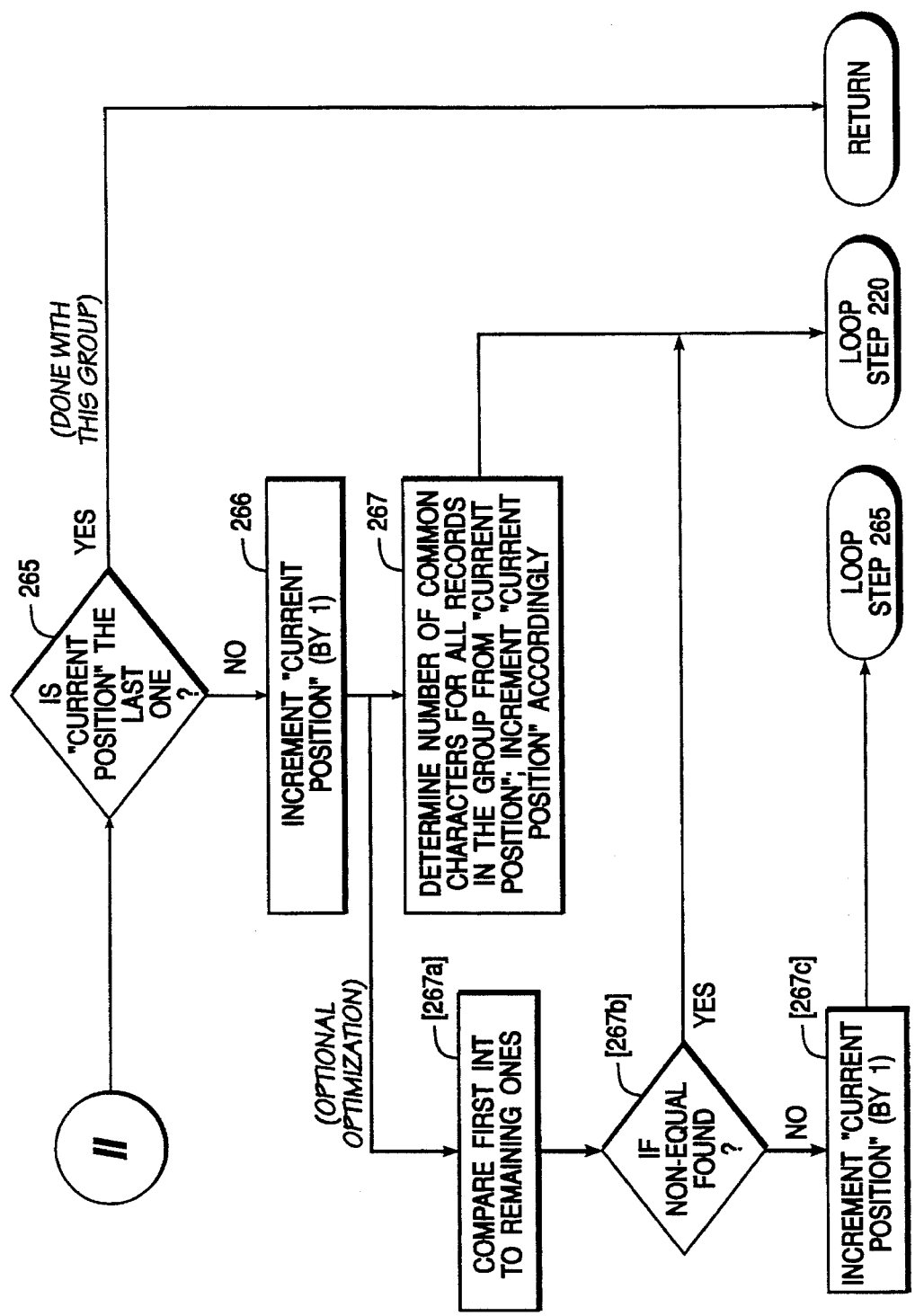

With particular reference to FIG. 2D, the submethod proceeds as follows. At step 265, if the "current position" is the last position, then the submethod is done (with this group) and will return. If the submethod is not at the last position (no at step 265), however, then the "current position" is incremented by one (iCurPos++) at step 266. At step 267, the number of common characters for all records in the group from "current position" is determined, with the "current position" incremented accordingly. In particular, the method points to the first record in the "current group" and computes the remaining length of the field from the "current position". Then, the record is compared to the rest of the records (one at a time), with the CompareLength being adjusted to the smallest common part encountered. If the CompareLength reaches zero at any point (see the "for" loop of the step below) the comparison is terminated. In any event, the current position is incremented by the minimum determined CompareLength before the method returns to step 220. In an exemplary embodiment, this step may be constructed by the following C language statements:

```
pRec = (ppRecPtrs[iGroupOffs])[iCurPos];
iCmpLen = iLastPos - iCurPos;
for (i = iGroupOffs +1 ; i < iGroupRecs -1; i++)
{
    // (CmpEqual returns the number of common chars)
    iCmpLen =
        min(iCmpLen, CmpEqual(pRec, (ppRecPtrs[i])[iCurPos]));
    if (iCmpLen == 0)
        break;
}
iCurPos += iCmplen;
```

As shown by step 267a, if the (optional) optimization of step 250 is available, then for step 267, the method may simply take the first integer, and compare it to all remaining integers in the group. As shown by step 267b, if a mismatch (non-equal comparison) is found, the method proceeds to loop back to step 220. Otherwise (no at step 267b), that is, all integers are equal, then the "current position" is incremented (by one) at step 267c, after which the submethod loops back to step 265. One should note that the integer array is now invalid and that the step is to be skipped the next time through the submethod.

Referring back to FIG. 2A, if the number of groups remaining is not equal to one at step 260 (i.e., subdivision present), the method proceeds to step 270 to establish ranges in the range array for each subgroup; the actual setup will depend on the sort ordered employed (e.g., ascending, descending, user-defined, or the like). In particular, this step proceeds as follows. The start positions in the record pointers array of the individual subgroup is determined. For an ascending sort order, the first subgroup belongs to the first non-zero counter in the "Counts" array and starts at the beginning of the "current group" (iGroupOffs). The start of the next subgroup is determined by adding the "count" for the first subgroup to its start; continuing in this fashion, it will belong to the next non-zero counter and so on. When sorting alphanumeric data, for example, an "A" group would precede a "B" group which would precede a "C" and so on. In an exemplary embodiment, this step may be constructed by the following C language statements:

```
iTmp = iGroupOffs;
for (i = 0; i < 256; i++)
    if (Counts[i])
    {
        Range[i] = iTmp; iTmp += Counts[i];
    }
```

For a descending sort order, the "Counts" array is simply processed in reverse. For user-defined or other sort orders, one would proceed in a selected ordinal direction as defined by that sort order, that is, how the order is defined for that particular character set. For a discussion of sorting on an international character set, for example, see U.S. Pat. No. 5,070,456, METHOD FOR FACILITATING THE SORTING OF NATIONAL LANGUAGE KEYS IN A DATA PROCESSING SYSTEM, the disclosure of which is hereby incorporated by reference.

Figure 2E:
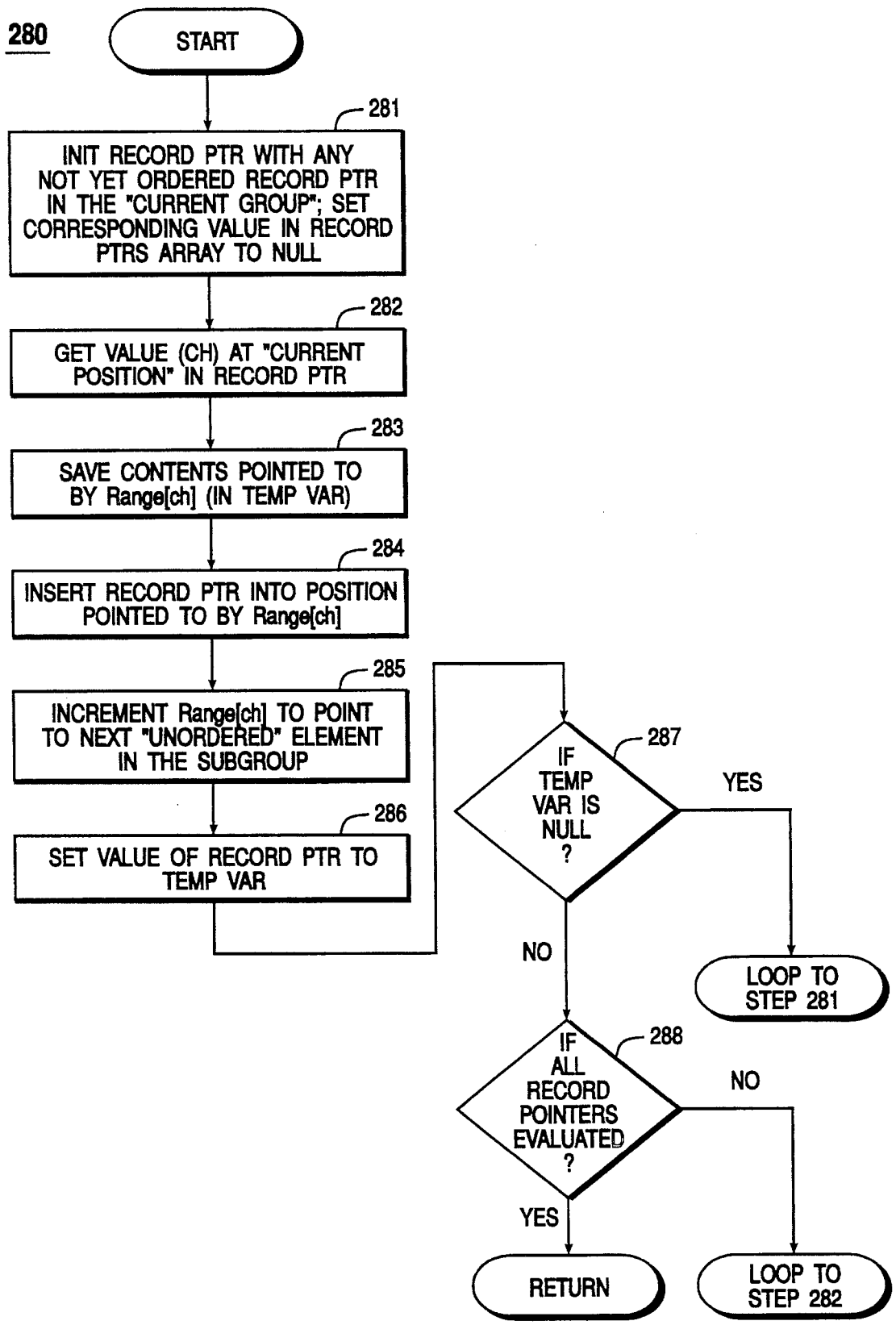

At step 280, as shown in FIG. 2B, all record pointers in the group are reordered into new subgroups. Specifically, for any record in the current group with a character "ch" at the "current position", the range array (Range [ch]) now points to the range where the pointer for that record must be placed. As shown in FIG. 2E, the substeps of step 280 are as follows. At step 281, the method initiates the record pointer with any unordered (not yet ordered) record pointer from the "current group"; a corresponding value in the pointers array is set to NULL. In step 282, the value for the character (ch) at the "current position" in the record pointer is retrieved. Next, at step 283, the contents pointed to by the range array (Range [ch]) is saved (e.g., in a temporary variable). After saving the contents, at step 284, the method proceeds to insert the record pointer in the position which is pointed to by the range array. At step 285, the range array is incremented by one to point to the next "unordered" element in the subgroup. At step 286, the value of the record pointer is set to the temporary variable (temp var). If temp var is NULL, at step 287 the method loops to step 81 for repeating the method with the pointer stored in the temporary variable. In step 288, if all record pointers have not yet been evaluated, then the submethod loops to step 282 for processing the next record pointer. Otherwise, the submethod has completed and may return (back to method 200).

Continuing at step 290 of FIG. 2B, the method determines whether the "current position" is the last position. If so (yes at 290), then the method is done with this group and may proceed to process the next group. Otherwise (no at step 300) the "current position" is incremented (by 1). Then, in step 310, for each subgroup, step 220 is recursively invoked. More particularly, for each subgroup determined in step 280, a new "current group" is set to be the subgroup, with the method then proceeding back to step 220. In an exemplary embodiment, this step may be constructed by the following C language statements:

```
for (i = 0; i < 256; i++)
    if (Count[i])
    {
        iGroupRecs = Count[i]
        iGroupOffs = Range[i] (-Count[i]);
        // Range was incremented goto step 220
        // Count[i] times in step 270
    }
```

Since step 310 is a recursive step, one should preferably avoid excessive recursion. According to the present invention, excessive recursion such as in a worst case scenario (e.g., where one subgroup contains more than fifty percent of the records) can be avoided by evaluating this subgroup last. In this manner, new "count" or "range" arrays need not be allocated for this subgroup; instead, one can simply reuse the ones which are already available. Employing this technique of the present invention, the maximum number of recursions necessary (the biggest subgroup possible in a recursion would contain fifty percent of the records) can be predicted by the following formula:

$$\log 2 \frac{\text{Total number of records}}{\text{Threshold level}}$$

Ex.: log 2(1 million/100) < 14

Thus, this represents the worst case scenario. More often, the results obtained would be substantially better.

International sorting

Special consideration is needed in the instance of performing true international sorting. For instance, the Danish character of "æ" (represented on IBM-compatible PCs as char code 145) must be expanded to the characters of "a" and "e" in order to do a proper sort (i.e., proper for that locale). Similarly, the character of " Æ" (char code 146) must be expanded into "A" and "E" for comparison.

International sorting basically involves two processes: a simple one-to-one mapping of the sort order, and the correct (and more complicated) treatment of collation sequences (for appropriately expanding characters and the like). In a typical system, sorting of international data with collation sequences substantially degrades sort performance (of a factor of about 5–10). Thus, the above-described sorting methodology, if it were applied by itself, would not be well suited to this task (since individual byte values are scanned).

According to the present invention, a method for performing true international sorting is provided. One should note that international data usually contains a modest percentage (e.g., about ten percent) of characters that need special processing, such as expansion. Relying upon this observation, an improved method of the present invention for sorting international data initially ignores the sort requirements of special character; that is, an initial sort is performed relying on the available character mapping (e.g., scanning byte values using the foregoing sort method of the present invention). This yields a set of data which is "nearly" or "almost" sorted. In particular, the vast majority of information records will be located in their correct position; however, a few records may be out of order (as a result of making the foregoing assumption). Next, a sorting methodology which takes advantage of "nearly" sorted data, such as insertsort, is employed using full collation sequences. Thus, the computationally expensive operation of employing collation sequences is minimized to those few records which actually require such processing. As a result, the total sorting time is substantially improved when compared to conventional international sorting techniques.

While there is no guarantee beforehand that a particular information set will include a limited number of characters which need expansion, the data to be sorted can be checked to confirm that it does not fall within an extreme case (as described at step 301 below). In those instances of extreme cases (i.e., where numerous expandable national characters are present in the data), the method may revert to a conventional sorting methodology (e.g., quicksort). Alternatively, the insertsort step below can be modified to count the number of unordered records (as it sorts), and abort early on if "extensive" sorting is taking place. Extensive or excessive sorting may be detected, for example, by simply counting the number of out-of-place records (e.g., by incrementing a count variable).

Figure 3:
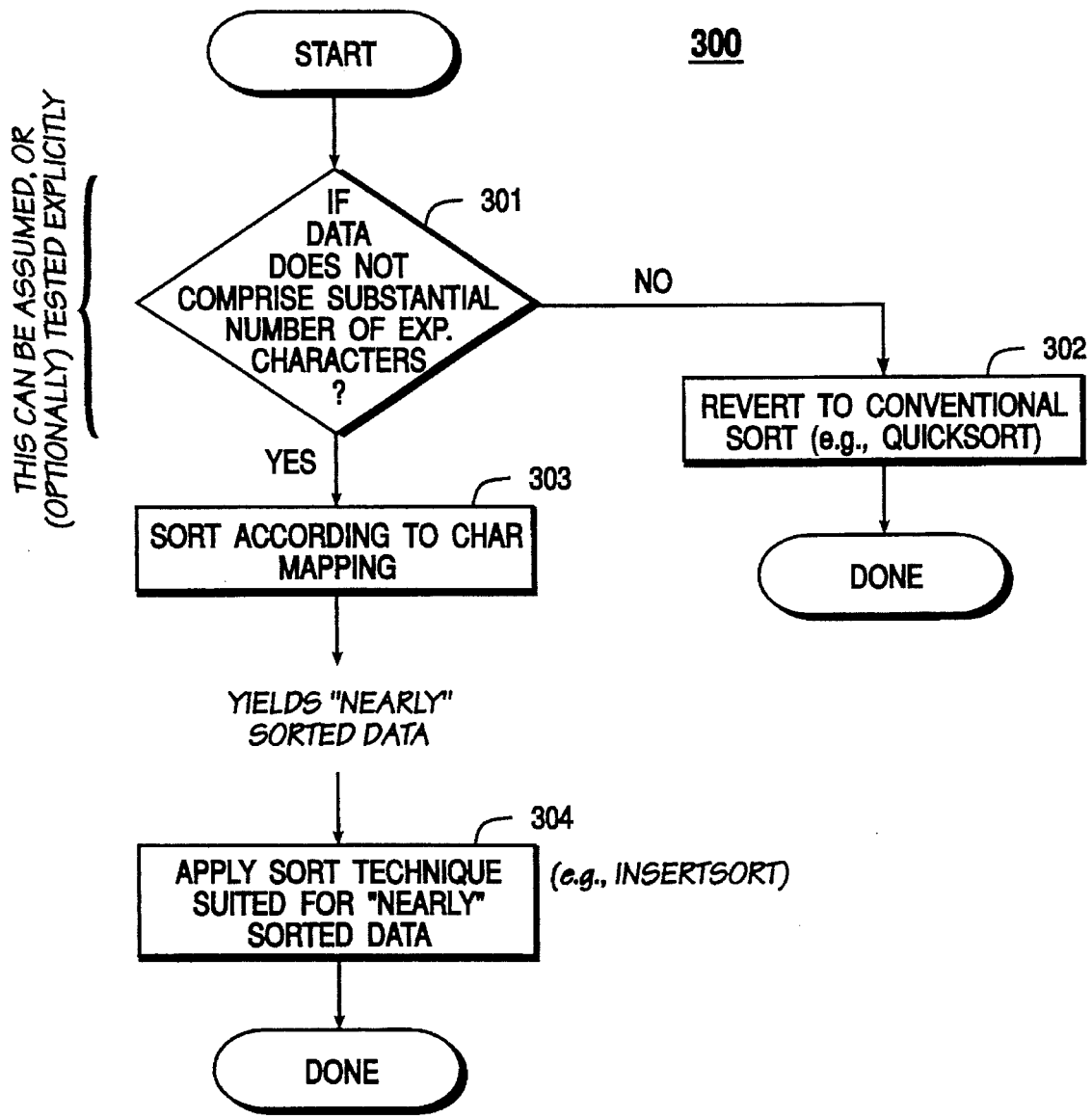
FIG. 3 is a flowchart illustrating a method of the present invention for international sorting.

Referring now to FIG. 3, a method 300 for improved international sorting will now be described. At step 301, the data to be sorted is tested to confirm that it does not fall within an extreme case (e.g., where the data comprises substantial number of expandable characters). If an extreme case is detected (no at step 302), then the method simply proceeds to sort the data using conventional improved sorting methodology (e.g., quicksort). Thus, steps 301, 302 are (optionally) added to appropriately handle extreme cases. At step 303, the data is sorted according to the available mapping, preferably using the above-described method 200, thus generating a data set which is nearly or almost sorted (i.e., a few records may be out of place). To complete the sort, a sort technique suited for nearly sorted data (e.g., insertsort) is applied at step 304, with the sort using the defined collating sequence (i.e., the true ordering relationship or sequence desired among the objects). As described above, the step may include a counter for detecting cases poorly suited for insertsort; in those instances, the method may revert to other sorting techniques (e.g., quicksort). All told, the method minimizes special processing of expandable characters to those instances (few records) where it is actually needed.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

What is claimed is:

1. In a computer system, an improved method for sorting a plurality of information records into a desired sequence, some of said information records storing at least two data members, some of the information records storing data members which are not identical from one data member of the record to another, the method comprising:

(a) determining for each record a value for the first data member;

(b) arranging the records into groups according to the value determined for the first data member of each record, wherein records having an identical value for the first data member are grouped together, and wherein at least some of said information records still remain to be sorted into said desired sequence;

(c) further dividing each group into smaller groups by repeating steps (a)–(b) for each one of subsequent data members of each record of each group, so that within any given group all records of the group share a common part said common part, comprising a sequence of data members starting from the first data member which is identical from one record of the group to another, wherein steps (a)–(b) continue to be repeated until the number of records remaining in said each group is less than a threshold value, and wherein upon conclusion of step (c) at least some of said information records still remain to be sorted into said desired sequence; and (d) as each group reaches said threshold value, sorting records remaining in the group using a selected one of quicksort and insertsort.

2. The method of claim 1, wherein step (d) starts comparisons for sorting at a data member position beyond the common part.

3. The method of claim 1, wherein step (c) is performed so that steps (a)–(b) are repeated last with a group having the largest number of records.

4. The method of claim 1, wherein said threshold value is empirically determined for the computer system.

5. The method of claim 1, wherein said threshold value is equal to about 100.

6. The method of claim 1, wherein in step (b) the groups themselves are arranged according to the desired sequence.

7. The method of claim 6, wherein the desired sequence is a selected one of an ascending, a descending, and a user-defined sort order.

8. The method of claim 7, wherein the desired sequence is an ascending order, and wherein the groups are arranged from a group having lowest-order members to one having highest-order members.

9. The method of claim 7, wherein the desired sequence is an descending order, and wherein the groups are arranged from a group having highest-order members to one having lowest-order members.

10. The method of claim 1, wherein said data member includes at least one byte.

11. The method of claim 1, wherein each said record stores a data structure comprising at least one field for storing at least one data member.

12. The method of claim 11, wherein each said record includes a plurality of fields, and wherein steps (a)–(d) are performed for selected ones of the fields.

13. The method of claim 11, wherein data members of a single field are of a common data type.

14. The method of claim 1, wherein each record is referenced by a pointer stored in a pointer array, and wherein sorting of records is achieved by ordering corresponding pointers in the pointer array.

15. The method of claim 14, further comprising the step of physically ordering the records according to the order of corresponding pointers stored in the pointer array.

16. A system for sorting a plurality of information records into a desired sequence, the system comprising:

(a) a computer having a processor and a memory, said memory for storing the information records, at least some of said information records having at least two data members, and said memory for storing a threshold value;

(b) means for determining for each record a value for the first of said at least one data member;

(c) means for arranging the records into groups according to the value determined for the first data member of each record, so that records having an identical value for first data members are grouped together in the memory, and wherein each group includes some records which have yet to be ordered into said desired sequence;

(d) means for further subdividing the records of each group into additional groups according to values determined for subsequent data members of each record, said means operative on a group until records remaining within a group number less than the threshold value, wherein each group includes some records which have yet to be ordered into said desired sequence, and wherein each record of each group shares a common part with other records of the group, said common part comprising a sequence of data members, starting from the first data member, having identical values from one record of the group to another; and (e) means for sorting records remaining in each group according to said desired sequence, said means employing a selected one of quicksort and insertsort.

17. The system of claim 16, wherein said threshold value is a value empirically determined for said processor and said memory to yield good performance.

18. The system of claim 16, wherein said threshold value is equal to about 100.

19. The system of claim 16, wherein said means for determining includes comparison means, coupled to the processor, for comparing the value of said at least one data member within a range of known values.

20. The system of claim 19, wherein said at least one data member comprises a byte (8 bits) and wherein said range of known values spans 256 possible values.

21. In a computer system, an improved method for sorting a plurality of information records according to a user-specified order, each said information record for storing a plurality of alphanumeric characters, the method comprising:

(a) before sorting the records, scanning successive alphanumeric character positions for each record for dividing the records into subgroups, each said subgroup including only those unsorted records which share a common part with other records of the subgroup, said common part comprising a sequence of identical alphanumeric characters starting from a first alphanumeric character position, each said subgroup being arranged relative to other subgroups according to the user-specified order; and (b) sorting records within each said subgroup with a conventional sort method comprising a selected one of quicksort and insertsort, so that all information records are sorted according to the user-specified order.

22. The method of claim 21, wherein in step (b) the conventional sort method is applied starting at an alphanumeric character location beyond the common part for the subgroup being sorted.

* * * * *